March 30, 1926.  1,578,634
C. BORGMANN
CLAMPING AND SUPPORTING DEVICE
Filed July 31, 1925
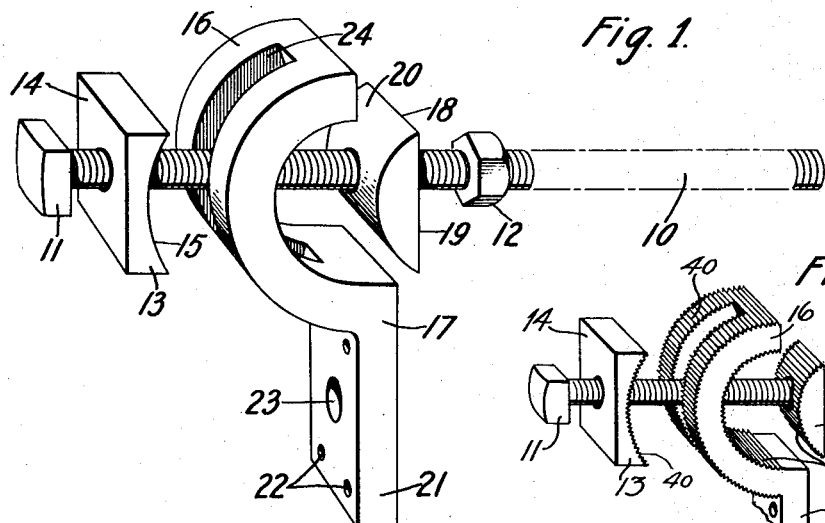
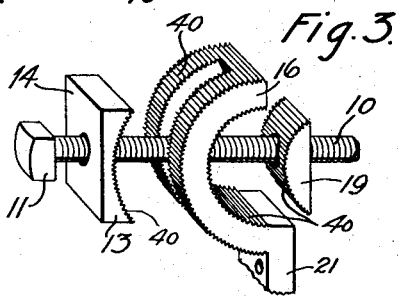
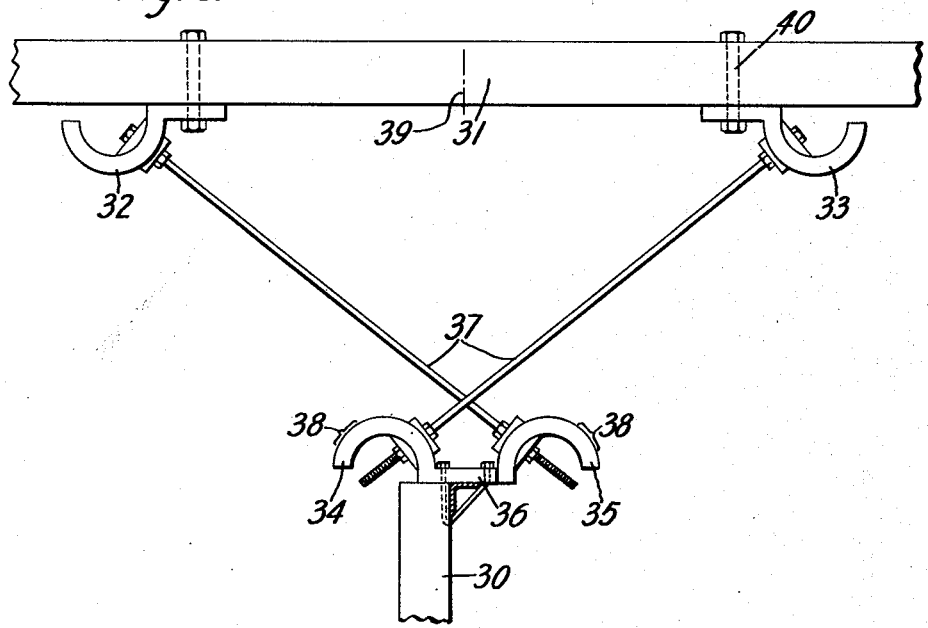
Inventor:
Charles Borgmann Patented Mar. 30, 1926.

1,578,634

UNITED STATES PATENT OFFICE.

CHARLES BORGMANN, OF GREAT NECK, NEW YORK, ASSIGNOR TO BELL TELEPHONE LABORATORIES, INCORPORATED, OF NEW YORK, N. Y., A CORPORATION OF NEW YORK.

CLAMPING AND SUPPORTING DEVICE.

Application filed July 31, 1925. Serial No. 47,377.

*To all whom it may concern:*

Be it known that I, CHARLES BORGMANN, a citizen of the United States of America, residing at Great Neck, Long Island, in the county of Nassau and State of New York, have invented certain new and useful Improvements in Clamping and Supporting Devices, of which the following is a full, clear, concise, and exact description.

This invention relates to clamping and supporting devices and more particularly to universal apparatus of this character designed to associate various supporting members situated at uneven heights or in planes not parallel to each other.

The object of the invention is to provide a simple and inexpensive clamping support that may be easily mounted and removed and expeditiously adjusted to make allowance for irregularities in structures to be supported or to enable changing the relative position of two supported members with respect to each other.

A feature of the invention comprises the combination with a bolting means of a slotted curved member integral with a flat portion adapted to be fastened to a surface, and means for retaining said curved slotted member in any position with respect to said bolt, depending only on the dimensions of the curved member and the length of the slot.

Other features and the use of the device in various combinations and forms will be apparent from the following description and the accompanying drawing in which Fig. 1 is an exploded view of one form of the device and Fig. 2 shows the application of the device in two forms as applied in the support of a rack, as for example, a telephone rack to supporting superstructure. Fig. 3 shows a modification of the device of Fig. 1, designed to insure greater gripping action than that obtained by friction, by the use of corrugations or means such as teeth, applied to the gripping or locking portions of the device.

Considering Fig. 1, 10 represents an ordinary bolt, portions of which may be threaded as desired. Head 11 of the bolt serves to retain any intermediate means clamped by nut 12. 13 represents the upper cap of the device of which flat portion 14 rests against head 11 and curved portion 15 is designed to fit and come in tight contact with curved portion 16 of supporting member 17 of the device. 18 shows the lower cap of the device of which flat surface 19 receives the pressure of nut 12 and curved surface 20 rests against and tightly fits into the concave portion of member 16 of the device. Supporting member 17 has flat portion 21 which may be attached to any surface or a supporting means by bolts or screws through holes 22 thereof. 23 is a hole in the flat portion through which another bolt may be passed to aid in supporting the device itself to an associated structure if necessary. Integral with flat portion 21 is curved portion 16 which may be semi-circular in shape or of any other desired contour. Slot 24 extends throughout the length of the curved portion and the bolt passes therethrough and may be rotated to any position therein depending only upon the dimensions of member 16 and the length of the slot. It should be noted, therefore, that the two auxiliary members 13 and 18 upon being clamped to the curved portion when bolt 12 is tightened, fit close to the circular member and have their inside surfaces coincident with the contour of the curved member and have their outside surfaces substantially parallel to each other. Flat portion 21 may be attached to a wall, ceiling or straight line frame superstructure as the case may be, and by means of the bolt clamped as aforesaid, support any other structure either directly held by the other end of the bolt or by a similar device attached to the other end of the bolt.

Fig. 2 illustrates the use of the device, as for example, in a telephone central office. Member 30 represents the usual frame or rack which it is desired to secure to superstructure 31. Members 32 and 33 represent clamping devices as shown in Fig. 1 and 34 and 35 similar clamping devices attached to the frame or rack 30. It may be noted that supports 34 and 35 may be combined so that one flat portion 36 has two curved projections integral therewith instead of one curved projection as shown in the device of Fig. 1. Such an arrangement is advantageous where a heavy piece of apparatus must be supported and where limited facilities are available for causing its support to a small surface which is either above or at an angle thereto. If such a type of device were used bolts 37 would extend to that portion of the slotted curved surface marked 38 or both bolts might be attached by a suitable coupling from one point only in a superstructure such as 39. This might be necessary in confined or narrow quarters.

The device of Fig. 3 may be used whenever excessive loads or great stresses may be encountered in supporting or bracing various related structures. In that case, upon revolving the bolt in the slot to any desired position and tightening the clamping nut 12, the teeth or corrugations of the concave surface of portion 13 would fit into corresponding teeth or corrugations of the curved portion 16. Similarly teeth or engaging means on the convex surface of cap 18 would engage similar means on the inner surface of the curved portion. As a result a locking action would be obtained that enables the device to withstand strains or sudden shocks without hazarding the shifting in position of any of the supported structures. It is understood, however, that the applicant does not limit himself to the employment of the teeth shown in Fig. 3, as his locking or engaging media. Any similar means will serve as well.

It will be observed that the device may be used to fasten an associated structure no matter in what plane or at what angle it is situated with respect the member to which the flat portion of the device is attached, by revolving the whole member about a bolt through the flat portion of the device as bolt 40 in Fig. 2. It is obvious, also, that one or more of the devices in combination, may be used to support one or more structures, situated at various angles to each other. Also, by means of bolts 40 of different length, members of unequal height may be associated with each other. All parts of the device may be of steel or the clamping members with the exception of the bolts and nut may be of wood or all parts may be of wood depending upon the use to which the device is applied.

What is claimed is:

1. A supporting device for retaining a structure situated at one level with respect to a structure situated at a different level comprising a flat portion adapted to be adjustably clamped to a surface in any desired position, curved portions integral with said flat portion, each having a slot therethrough and a bolt passing through said slot, means for firmly positioning said bolts in said slots and for easily shifting said bolts as desired.

2. A supporting means comprising a flat member, a curved member, means for rotatably positioning said flat member with respect to a surface, a bolt through said curved member, clamping supports associated with said curved member on each side thereof and coincident with the contour thereof, said bolt being adapted to pass through said clamping supports and curved member and means for fixing said bolt at any point of said curved member whereby said clamping supports will have their inside surfaces in contact with said curved member and their outside surfaces substantially parallel to each other.

In witness whereof, I hereunto subscribe my name this 15th day of July, A. D., 1925.

CHARLES BORGMANN.